United States Patent
Berfanger et al.

(10) Patent No.: US 10,425,637 B2
(45) Date of Patent: Sep. 24, 2019

(54) CROSS-CALIBRATION OF IMAGERS

(71) Applicant: Hewlett-Packard Development Company, L.P., Houston, TX (US)

(72) Inventors: David Berfanger, Vancouver, WA (US); John Hatcher, San Diego, CA (US); Amanda J Gillihan, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 15/521,701

(22) PCT Filed: Oct. 31, 2014

(86) PCT No.: PCT/US2014/063445
§ 371 (c)(1),
(2) Date: Apr. 25, 2017

(87) PCT Pub. No.: WO2016/068997
PCT Pub. Date: May 6, 2016

(65) Prior Publication Data
US 2017/0244961 A1 Aug. 24, 2017

(51) Int. Cl.
*H04N 1/40* (2006.01)
*H04N 17/00* (2006.01)
*G06F 16/583* (2019.01)
*H04N 1/60* (2006.01)
*G06T 7/80* (2017.01)

(52) U.S. Cl.
CPC ....... *H04N 17/002* (2013.01); *G06F 16/5838* (2019.01); *G06T 7/80* (2017.01); *H04N 1/6052* (2013.01); *G06T 2207/10024* (2013.01)

(58) Field of Classification Search
CPC ...... H04N 17/002; H04N 1/6052; G06T 7/80; G06T 2207/10024; G06F 17/3025; G06F 16/5838
USPC ........ 358/474, 448, 443, 505, 504, 514, 530
See application file for complete search history.

(56) References Cited

U.S. PATENT DOCUMENTS

| 5,414,537 | A | 5/1995 | Omura et al. |
| 5,434,645 | A | 7/1995 | Usami |
| 5,583,666 | A | 12/1996 | Ellson et al. |
| 7,016,533 | B1 | 5/2006 | Bawolek et al. |
| 7,271,380 | B2 | 9/2007 | Banton et al. |

(Continued)

FOREIGN PATENT DOCUMENTS

| CN | 1227999 | 9/1999 |
| JP | 0646448 | 2/1994 |

*Primary Examiner* — Cheukfan Lee
(74) *Attorney, Agent, or Firm* — Brooks Cameron & Huebsch PLLC (57) ABSTRACT

Example implementations relate to cross-calibration of imagers. For example, cross-calibration of imagers can include modeling a response of each of a plurality of imagers to a color sample, modeling a response of a composite the a plurality of imagers to the color sample based on the modeled response of each of the plurality of imagers to the color sample, generating generate a cross-calibration of the modeled response of each of the plurality of imagers to the modeled response of the composite of the plurality of imagers, and generating a calibration of the modeled response of the composite of the plurality of imagers to a response of a reference imager.

15 Claims, 4 Drawing Sheets

(56) References Cited

U.S. PATENT DOCUMENTS

| | | | |
|---|---|---|---|
| 7,474,339 B2* | 1/2009 | Hoshuyama | H04N 9/045 |
| | | | 348/223.1 |
| 7,619,783 B2 | 11/2009 | Angal et al. | |
| 7,843,609 B2 | 11/2010 | Caster et al. | |
| 9,230,326 B1* | 1/2016 | Liu | G06T 7/80 |
| 9,986,233 B1* | 5/2018 | Curlander | H04N 17/002 |
| 2005/0152007 A1 | 7/2005 | Cunnagin et al. | |
| 2007/0247681 A1 | 10/2007 | Klassen | |
| 2009/0063079 A1 | 3/2009 | Klassen | |
| 2009/0121162 A1 | 5/2009 | Mizes et al. | |
| 2009/0153745 A1* | 6/2009 | Park | H04N 17/002 |
| | | | 348/708 |
| 2009/0163796 A1* | 6/2009 | Simpson | A61B 5/0066 |
| | | | 600/407 |
| 2009/0168116 A1 | 7/2009 | Cui | |
| 2010/0310117 A1 | 12/2010 | Rred et al. | |
| 2012/0296595 A1 | 11/2012 | Dalal et al. | |
| 2013/0033585 A1 | 2/2013 | Li et al. | |
| 2013/0083309 A1* | 4/2013 | Shim | G01S 7/497 |
| | | | 356/4.07 |
| 2013/0155251 A1 | 6/2013 | Moravchik | |
| 2014/0185102 A1 | 7/2014 | Edwards et al. | |
| 2015/0141854 A1* | 5/2015 | Eberle | A61B 5/02154 |
| | | | 600/488 |
| 2015/0331078 A1* | 11/2015 | Speck | G01R 33/28 |
| | | | 382/103 |
| 2016/0176343 A1* | 6/2016 | Sakano | G06T 7/80 |
| | | | 348/148 |
| 2016/0193482 A1* | 7/2016 | Fahrig | A61N 5/1078 |
| | | | 600/1 |
| 2019/0043220 A1* | 2/2019 | Kumar | G06T 7/85 |
| 2019/0045084 A1* | 2/2019 | Guttman | G01J 3/50 |

\* cited by examiner

FIG. 4

CROSS-CALIBRATION OF IMAGERS

BACKGROUND

A digital imaging device may use an imager to generate a response. The response may be a digital response signal output characterizing a color of an imaged subject. A digital imaging device can be a digital scanner that, for example, may image a document placed adjacent an imager.

DETAILED DESCRIPTION

A digital imaging device may include a plurality of imagers. The imagers may be used to image a subject (e.g., a printed document). The imagers may be oriented in various arrangements. For example, the imagers may be oriented to increase the capacity of the digital imaging device and/or to accommodate larger documents. The imagers may be arranged to increase the resolution of the image of the document and/or image the front and back of the document.

The imager may be a scan bar. A digital scanner can have a plurality of cooperating scan bars. Respective digital response signal outputs of the plurality of cooperating scan bars can be combined to represent an image scanned by the scan bars.

An imager of the digital imaging device can be a contact image sensor (CIS) scan bar. The plurality of imagers can be a plurality of scan bars. A scan bar can be made up of scan bar components including a light emitting diode (LED) light source, a detector array, and an optical system. A scan bar can generate a response (e.g., signal output) upon scanning of a subject. The imager signal outputs of the plurality of imagers can be combined (e.g., stitched together) to form an electronic representation of the subject. The response signals can be used to reproduce an image of the imaged subject (e.g., a display of an image of the subject, print an image of the subject, etc.).

A measure of the quality of a digital imaging device may include the faithfulness with which it captures the colors of the imaged subject. However, due to manufacturing difference between imagers and/or other differences among imagers and their constituent components, imagers may generate incongruent response signal outputs for the same imaged subject. For example, digital color response signal outputs produced by different imagers can differ in how they encode an actual color of the imaged subject as it is perceived by human vision.

In an effort to address these incongruences, the digital imaging device may be color-calibrated. Traditionally, color-calibrating a digital imaging device may be conducted by scanning, with the digital imaging device, a colored subject including color samples, each color sample having known spectrophotometrically characterized reflectance properties. Scanning a subject such as a color sample(s) may produce a data set of digital imaging device response signal outputs (e.g., device red, green, and/or blue measurements) that may be matched with a corresponding colorimetric data set (e.g., CIEXYZ color space coordinates). Subsequently, a map can be generated by calibration software between these two data sets (the data set of digital imaging device response signal outputs and the data set of the spectrophotometrically characterized reflectance data).

However, such color-calibrating may be labor intensive, involving manual inputs, and/or be computationally expensive, among other deficiencies. For instance, the amount of physical sampling and mapping to achieve the color-calibration may represent a substantial computational cost. Further, such color-calibration involves the manual use of the physical target scanned by the digital imaging device. This introduces a labor and time cost to color-calibrating the digital imaging device. Such color-calibration may also include manual adjustments to the mapping by a manufacturer or expert practitioner. Such color-calibration may occur on the assembly line for the digital imaging device. However, such color-calibration may not be automatable because of the reliance on physical colored subjects including color samples, spectrophotometer instrumentation, manual adjustments, and intensive computations. For example, on an assembly line the digital imaging device can scan the colored target and the resulting measurements can be exported through an external harness to a device to perform the calibration computations. However, scanning a calibration target on an assembly line adds time to assembly, which is costly and further limits the number of units that a single line can assemble in shift. Producing, maintaining and managing the colored target is further time consuming and expensive. And, the color-calibration resulting from such computations may require manual adjustments resulting in additional difficulties and/or costs in manufacturing a digital imaging device.

Notably, such color-calibration may function to bring a response signal of a digital imaging device colormetrically closer to how a scanned target is perceived by human vision. However, such methods of color calibration may not sufficiently correct imaging defects such as those resulting from variation among imagers/imager components. For example, such color calibration of a digital imaging device including a plurality of imagers may not address a lack of signal uniformity across the plurality of imagers. That is, since response signals for each imager are imager-dependent and each imager can have distinct imager attributes, the response signals may lack uniformity. Incongruent response signal outputs from cooperating imagers can result in visual defects such as variable color representations in the image of a uniformly colored subject.

Another approach to color calibrating a digital imaging device does not use a physical colored subject including color samples, but rather utilizes virtual color samples (i.e. color sample data) defined in the context of comprehensive mathematical models based on particular characteristics of a digital imaging device and the subject media to be scanned. These models can be used to produce both a data set of modeled device response signal outputs for the digital imaging device and a corresponding data set of modeled color connection space coordinates for the digital imaging device. Subsequently, these two data sets may be provided to calibration software, to produce a mapping between them. While this approach of digital imaging device calibration can reduce the labor and time to perform the calibration, the calibration software may be too computationally intensive to execute in the limited resource environment of typical digital imaging device hardware and/or may be generally not automatable as it, too, often includes manual adjustments made by expert practitioners. Notably, in either approach, a lack of signal uniform y across a plurality of imagers of the digital imaging device leading to a lack of color uniformity across an imaged subject may not be accounted for.

In contrast, examples of the present disclosure describe a system, method, and device for cross-calibration of imagers. Cross-calibration of imagers, as described herein, does not rely on use of a physical target. Examples of the present disclosure cross-calibrate imagers utilized in producing a single scanned image to correct incongruent imager responses (e.g., to account for a lack of signal uniformity across the imagers). For example, the examples of the present disclosure can include modeling a response of a composite of a plurality of device imagers to a color sample based on a modeled response of each of the plurality of imagers to the color sample, generating a cross-calibration of the modeled response of each of the plurality of imagers to the modeled response of the composite of the plurality of imagers, and generating a calibration of the modeled response of the composite of the plurality of imagers and to a response of a reference imager.

Figure 1:
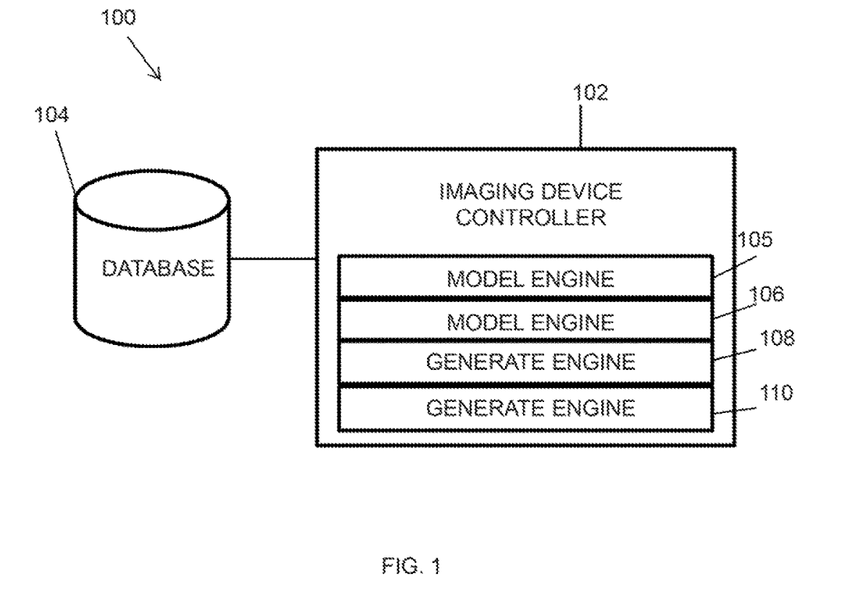
FIG. 1 illustrates a diagram of an example of a system suitable for cross-calibration of imagers according to the present disclosure.
Figure 2:
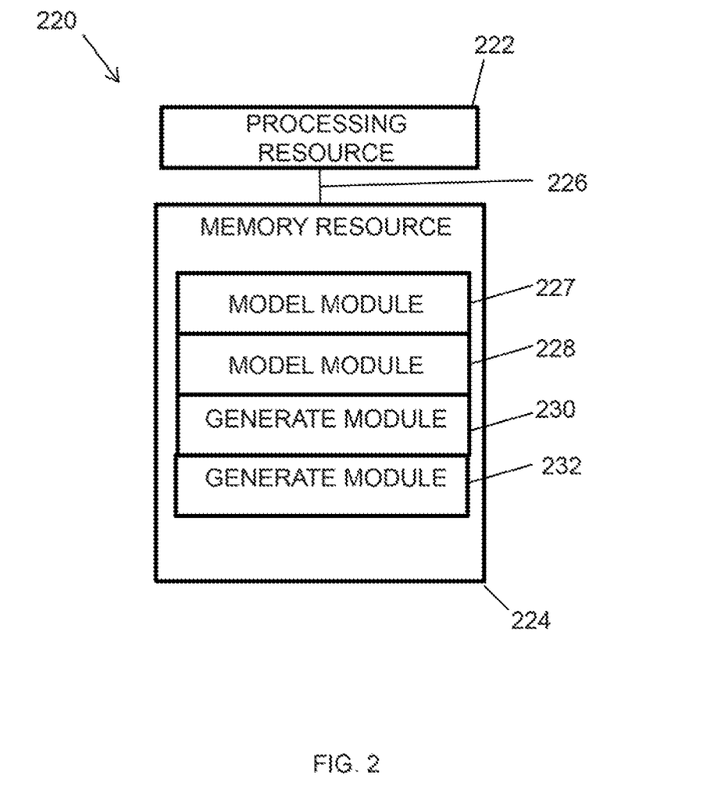
FIG. 2 illustrates a diagram of an example of a computing device according to the present disclosure.

FIGS. 1 and 2 illustrate examples of system 100 and a computing device 220, respectively, according to the present disclosure. FIG. 1 illustrates a diagram of an example of a system 100 for cross-calibration of a plurality of imagers according to the present disclosure. The system 100 can include a database 104, a digital imaging device controller 102, and/or a number of engines (e.g., model engine 105, model engine 106, generate engine 108, generate engine 110), among other components. The digital imaging device controller 102 can be in communication with the database 104 via a communication link and can include a number of engines (e.g., model engine 105, model engine 106, generate engine 108, generate engine 110). The digital imaging device controller 102 can include additional or fewer engines than are illustrated to perform the various functions as will be described in further detail. For example, the system 100 can include engines to perform the functions of an imaging device 340 and a method 480 described herein.

The number of engines (e.g., model engine 105, model engine 106, generate engine 108, generate engine 110) can include a combination of hardware and programming, but at least hardware, that is to perform functions described herein (e.g., modeling a response of a composite of a plurality of device imagers to a color sample based on a modeled response of each of the plurality of imagers to the color sample, etc.). The programming can include program instructions (e.g., software, firmware, etc.) stored in a memory resource (e.g., computer readable medium, machine readable medium, etc.) as well as hard-wired programs (e.g., logic).

The model engine 105 can include hardware and/or a combination of hardware and programming, but at least hardware, to model a response of each of a plurality of imagers to a color sample. The model can be based on an imager attribute of the modeled imager. As used herein, an imager includes a component, of a digital imaging device for generating a response indicative of at least a color of an imaged subject. The imagers can be contact image sensor scan bars. The imagers can include a light source (such as an LED light source), a detector array, and an optical system. As used herein, a response can include an output signal that is generated by a light sensing detector array of the imager, the output signal being related to an amount of light that is incident on the surface of the array. As used herein, modeling a response can include generating a predicted response output signal generated by an imager upon imaging a particular subject including particular colors.

The model can be the result of a mathematical operation executed using an imager attribute as an input from which to generate predicted response signal outputs such as signals characterizing the responses of an imager upon imaging a particular subject including a particular color characterized by particular color sample data. The color sample data can characterize the reflectance spectrum of the particular color. During the manufacture of each imager, the emission spectrum of each color of the illumination source can be measured. Such a measurement can be captured using a spectrometer. The resulting emission spectra defined by the spectrometer can be encoded to form the imager attribute. The imager attribute can be stored in a non-transitory memory component of the imager. The modeled response for each imager of the plurality of imagers may be calculated at least in part by using a model of the imager, the imager attribute, and color sample data.

The model engine 106 can include hardware and/or a combination of hardware and programming, but at least hardware, to model a response of a composite of a plurality of device imagers to a color sample based on a modeled response of each of the plurality of imagers to the color sample. As used herein, the plurality of imagers includes a number of imagers forming constituent components of a digital imaging device whose response signals can be stitched together to form an image, display, and/or print of the imaged subject.

As used herein, the composite of a plurality of imagers is not a separate physical imager, but is a model defining response signal outputs of a hypothetical imager. The hypothetical imager can be assumed to have or generate response signal outputs indicative of having imager attributes that are a composite of the imager attributes of a portion of the plurality of imagers of a digital imaging device. The model of the composite of the plurality of imagers can be a common point that splits a difference between and/or acts as a modified average of the individual models. That is, the model can be mathematical expressions of composite signal outputs that are as close as possible to the response signal outputs of each of the individual imagers in the composite such that subsequent color transformations can be successful. The color transformations, described in greater detail hereafter, can have a limited numerical power to match each response signal output of an imager. Rather than exhaust the limited numerical power entirely to match the plurality of imager response signals a reference imager (in this case an imager of the plurality of imagers that is significantly different from the other imagers of the plurality of imagers is limited in its ability to be successfully mapped to the reference imager in a congruent manner with the other imagers) the model of a composite can generate a common point among the response signal outputs of the imagers of the plurality to target in the transformation. The composite model can thereby represent modeled response signal outputs to utilize a portion of the numerical power of the transformations to achieve, so that a successful congruent mapping to the reference imager is possible with the remaining numerical power of the color transformation.

The model of the composite of the plurality of imagers can be generated by a variety of mathematical operations performed upon modeled response signal outputs of the plurality of imagers that will generate a composite value for, for example, Red Green Blue (RGB) values of the plurality of response signal outputs of the plurality of imagers. For example, the model of the composite of the plurality of imagers can be a model of RGB values selected such that the incongruence of the composite RGB values to the RGB values of any one of the plurality of imagers is less than the incongruence of that imager to any other of the plurality of imagers.

The generate engine 108 can generate a cross-calibration of the modeled response of each of the plurality of imagers to the modeled response of the composite of the plurality of imagers. Cross-calibrating can include calculating a imager cross-calibration from the modeled imager responses, the modeled composite imager responses and/or a set of importance weightings, for example, for certain colors, hues, saturation levels, image portions, proximal imagers, etc. An imager cross-calibration can be a mapping for transforming the response signal, output of one imager into the response signal output of another imager (e.g., other imagers of the plurality of imagers, the hypothetical composite imager, etc.) and/or mapping for transforming an imager's response signal output into corresponding coordinates in a color connection space. The cross-calibration may be calculated as a linear mapping, but since the relations are not linear over the color gamut of the imager the results can be refined by applying univariate non-linear functions to imager response signal outputs prior to a linear mapping. Defining a univariate transformation function can include selecting the function to linearize a neutral axis response of the imager or to further comparatively reduce calibration errors over the color gamut of the imager. Multivariate techniques may also be used to refine the results.

Cross-calibrating can include developing a transformation matrix for each of the constituent imagers of the digital imaging device that can be used to transform a response signal output value of the corresponding imager to a response signal output value of the composite of the plurality of imagers. That is, cross-calibrating can include developing a transformation matrix that can transform a modeled response signal output of an imager to approximate a response signal output of a composite of the plurality of imagers. The response signals of the imagers can be transformed in a manner that weights not only the quantity of differences between given imager attributes, but also the spatial relationship between given imagers. For example, an imager attribute difference resulting in different imager response signal outputs from imagers that are adjacent one another or that collectively produce adjacent portions of a stitched image of the subject can be particularly noticeable to the human eye. Accordingly, cross-calibrating can include mathematically penalizing (e.g., via weighting, etc.) certain errors such as differences between the imager attributes of adjacent imagers resulting in differences in response signal outputs translating to visual defects upon display. Cross-calibrating can include penalizing differences in response signal outputs of adjacent imagers of the plurality of imagers more heavily than a difference in response signal outputs of non-adjacent imagers in developing transformation matrices during cross-calibration.

The generate engine 110 can generate a calibration of the modeled response of the composite of the plurality of imagers to a response of a reference imager. Generating a calibration of the modeled response of the composite of the plurality of imagers can include developing a transformation matrix that transforms a modeled response signal output of the composite of the plurality of imagers and/or each of the modeled response signal outputs of the plurality of imagers to a response signal output value of a reference imager. That is, the calibration can include developing a matrix that can map a modeled response of a composite of the plurality of imagers and/or a response of each of the imagers of the plurality of imagers to approximate a response of a reference imager. As used herein, a reference imager can include a nominal representative sample imager of a population of imagers that is determined to have a most probable imaging attribute of imagers selected at random from a manufactured population of that imager type. A response of a reference imager can include an actual response of the physical reference imager generated upon a traditional characterization of the reference imager. The characterization can be performed upon matching response signal output values to spectrophotometric characterizations of colored subjects including color samples upon imaging of those samples. Additionally, a response of a reference imager can include a modeled reference imager response determined based on the actual response of the reference imager generated during the traditional characterization. The model reference imager response can be based on a model that models the response of the reference imager across the gamut of color sample data based on the actual response of the reference imager to an imaged colored subject including a color sample.

The calibration can include generating a transformation to further transform the adjusted response of each of the plurality of imagers into an intermediate device-independent color connection space (e.g., CIEXYZ, CIELAB, etc.) coordinates. The calibration can further include generating a transformation to transform the intermediate device-independent color space coordinates into device-referred color connection space (e.g., device referred sRGB color encoding) coordinates. The calibration can be performed automatically (e.g., performed during execution of a program such as upon power up of the device, just-in-time, etc.) by the device as opposed to being performed prior to shipping the product by, for example, the manufacturer on the manufacturing line.

It is notable that two calibrations can occur. The reference imager can be calibrated and reference transformations can be derived to map reference imager response signal outputs to CIEXYZ, or sRGB, or printer CMYK, etc. Then, other imagers can be calibrated to match the reference imager and the reference mappings can be reused to perform the CIEXYZ, or sRGB, or CMYK mappings. Generating the later mappings can be relatively difficult (e.g., relatively more labor intensive, relatively more computationally expensive, etc.). Alternatively, generating the former mappings is relatively easier (e.g., relatively less labor intensive, relatively, less computationally expensive, etc.) but a nave implementation can be either or both of inaccurate and computationally expensive. Utilizing the two calibrations described above, accurate transformations can be accomplished utilizing relatively few computation resources, such that the transformation can be implementing on firmware of the imaging device.

FIG. 2 illustrates a diagram of an example of a computing device 220 according to the present disclosure. The computing device 220 can utilize software, hardware, firmware, and/or logic to perform functions described herein.

The computing device 220 can be any combination of hardware and program instructions to share information. The hardware, for example, can include a processing resource 222 and/or a memory resource 224 (e.g., non-transitory computer-readable medium (CRM), machine readable medium (MRM), database, etc.). A processing resource 222, as used herein, can include any number of processors capable of executing instructions stored by a memory resource 224. Processing resource 222 can be implemented in a single device or distributed across multiple devices. The program instructions (e.g., computer readable instructions (CRI)) can include instructions stored on the memory resource 224 and executable by the processing resource 222 to implement a desired function (e.g., model a response of each of a plurality of imagers to a color sample; model a response of a composite of a plurality of device imagers to a color sample based on a modeled response of each of the plurality of imagers to the color sample; generate a cross-calibration of the modeled response of each of the plurality of imagers to the modeled response of the composite of the plurality of imagers; generate a calibration of the modeled response of the composite of the plurality of imagers to a response of a reference imager; etc.). The program instructions can include instructions stored on the memory resource 224 and executable by the processing resource 222 to implement a portion of the functions of the system, device, and method described herein.

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., model module 227; model module 228; generate module 230; generate module 232) can include CRI that when executed by the processing resource 222 can perform functions. The number of modules (e.g., model module 227; model module 228; generate module 230; generate module 232) can be sub-modules of other modules. For example, the generate module 232 and generate module 230 can be sub-modules and/or contained within the same computing device. In another example, the number of modules (e.g., model module 228; generate module 230; generate module 232) can comprise individual modules at separate and distinct locations (e.g., CRM, etc.), Each of the number of modules (e.g., model module 227, model module 228; generate module 230; generate module 232) can include instructions that when executed by the processing resource 222 can function as a corresponding engine as described herein. For example, the model module 227 and the model module 228 can include instructions that when executed by the processing resource 222 can function as the model engine 105 and the model engine 106, respectively. In another example, the generate module 230 and generate module 223 can include instructions that when executed by the processing resource 222 can function as the generate engine 108 and generate engine 110, respectively.

Figure 3:
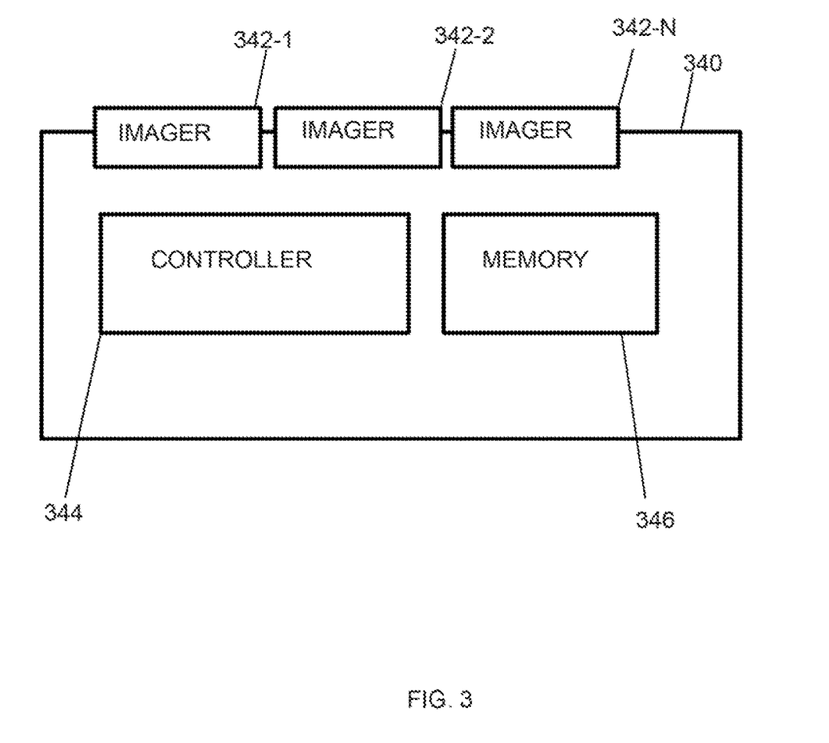
FIG. 3 illustrates an example of an imaging device suitable for cross-calibration of imagers according to the present disclosure.

FIG. 3 illustrates an imaging device 340 according to the present disclosure. The imaging device 340 can include a plurality of imagers 342-1 . . . 342-N. The plurality of imagers 342-1 . . . 342-N can include a reduction-type linear sensor (CCD) and/or a contact image sensor (CIS). The plurality of imagers 342-1 . . . 342-N can be made up of imager components. For example, each of the plurality of imagers 342-1 . . . 342-N can be made up of components including an illumination system, an optical system, and/or a light sensing system. An illumination system, an optical system, and/or a light sensing system can be present as individual scan bars used for scanning a subject.

In examples where the plurality of imagers 342-1 . . . 342-N are CIS imagers the illumination can comprise a set of LEDs shining down a light guide that directs light onto a subject. In CIS imager examples, the optical system can include a rod lens array that directs the LED light reflected from the imaged subject surface onto the light sensing system. For example, the illumination system can include three colored LEDs (red, green, blue), which are pulsed sequentially to obtain separate exposures under the illumination of each color. In CIS imager examples, the light-sensing system can include a linear array of detector cells, each of which produces output signals that are related to the amount of light that is incident on the detector surface. Further, the detector array spacing can be the same scale as the information being captured from the subject, and light can be imaged by the optical system directly onto the detector cells at 1:1 magnification. The corresponding signal outputs from the light-sensing system can be compiled and digitized into raw RGB pixel data.

When a uniform, flat-field light falls on the plurality of imagers, small variations in detector cell output (e.g., response signal output) of each imager can be observed as fixed-pattern noise in the resulting image. Two types of fixed-pattern noise can be encountered: dark signal non-uniformity (DSNU) and photo response non-uniformity (PRNU). Due to thermal and electrical noise, detector cells can have non-zero output in dark conditions. DSNU can include variations in this dark signal from pixel to pixel. Similarly, PRNU can include pixel-to-pixel variations in cell output as a function of illumination level. These variations can be caused by physical properties (e.g., imaging attributes) of the imagers themselves.

Prior to a color-calibration of the plurality of imagers 342-1 . . . 342-N, the value of the flat-fielded corrected response signal output of each color channel of each imager can be approximated according to its corresponding imaging attribute. An imaging attribute can include a measured spectral property of the corresponding imager components. A spectral property can include an encoded characterization of a wavelength distribution of a light emitted by an LED component of the imager. For example, a response signal output of a CIS imager can be summarized by the spectrum of the light emitted by each of its constituent LEDs. The imaging attribute can be pre-stored (e.g., stored prior to the cross-calibration and/or calibration operations, stored prior to shipment of the imaging device 340, etc.) on an erasable programmable read only memory (EPROM) of the imaging device 340.

The imaging device 340 can include a controller 344. The controller can be analogous to controller 102 described with respect to FIG. 1. The controller 344 can be coupled to the plurality of imagers 342-1 . . . 342-N. The controller 344 can accept data from the plurality of imagers 342-1 . . . 342-N and/or data pre-stored in memory 346 as inputs. Memory 346 can be analogous to memory resource 224 discussed with respect to FIG. 2. The controller 344 can utilize the inputs to perform a number of calculations and transformations of response signal outputs.

The controller 344 can model a response of each of the plurality of imagers 342-1 . . . 342-N to a colored subject including a color sample based on the corresponding imaging attribute of the imager. The model response can include a spectral model of a response of each of a red, green, and blue channel of LEDs of the modeled imager to a colored subject including a color sample. For example, a response signal output of a CIS imager can be summarized by the spectral signature (e.g., spectrum of the light emitted) of each of its constituent LEDs. Spectral signatures for the LEDs used in CIS imagers can provide narrow wavelength curves. Since the curves are narrow, the spectral properties of the optical system and/or the light sensing system can be approximated as constants. Which are normalized during PRNU compensation.

A wavelength distribution can be determined for each LED using a spectrometer. The wavelengths distribution can be predetermined and pre-stored in the memory 346. After a wavelength distribution has been determined, each channel of the RGB response can be modeled by the controller 344 as the inner product of the spectral signature of its corresponding LED with the spectral reflectance of a test sample. For example, for an imager characterized by known wavelength distribution, spectral response of each of the R, G and B channels can be modeled at each of a selection of Λ discrete wavelengths. These modeled values can be arranged into a Λ×3 matrix, as follows:

$$\Phi = \begin{bmatrix} \varphi_{1,1} & \varphi_{1,2} & \varphi_{1,3} \\ \varphi_{2,1} & \varphi_{2,2} & \varphi_{2,3} \\ \vdots & \vdots & \vdots \\ \varphi_{\Lambda,1} & \varphi_{\Lambda,2} & \varphi_{\Lambda,3} \end{bmatrix}.$$ (Eq. 1.1)

Where the spectral reflectance measurements of a set of N color patch targets at the same Λ discrete wavelengths is available they can be arranged into an N×Λ matrix P as follows:

$$P = \begin{bmatrix} \rho_{1,1} & \rho_{1,2} & \cdots & \rho_{1,\Lambda} \\ \rho_{2,1} & \rho_{2,2} & \cdots & \rho_{2,\Lambda} \\ \vdots & \vdots & \ddots & \vdots \\ \rho_{N,1} & \rho_{N,2} & \cdots & \rho_{n,\Lambda} \end{bmatrix}.$$ (Eq. 1.2)

The controller 344 can calculate the modeled device RGB values for each color patch target, as follows:

$$\tilde{S}=P\Phi,$$ (Eq. 1.3)

where for the $n^{th}$ target, the device response values $\tilde{R}_n$, $\tilde{G}_n$ and $\tilde{B}_n$ can be arranged in the N×3 matrix $\tilde{S}$ as follows:

$$\tilde{S} = \begin{bmatrix} \tilde{R}_1 & \tilde{G}_1 & \tilde{B}_1 \\ \tilde{R}_2 & \tilde{G}_2 & \tilde{B}_2 \\ \vdots & \vdots & \vdots \\ \tilde{R}_N & \tilde{G}_N & \tilde{B}_N \end{bmatrix},$$ (Eq. 1.4)

The plurality of imagers 342-1 . . . 342-N of the imaging device 340 can be selected from a population of imagers (e.g., specific types of imagers being used in the manufacture of the digital imaging device). A reference imager can be a predetermined nominal imager selected from a representative sample population of imagers. The reference imager can be an imager of the population that is determined to have a most frequently and/or probably occurring set of imaging attributes (e.g., spectral characteristics) of imagers selected at random from the imager manufacturing line.

A traditional characterization of the reference imager can be performed. For example, the reference imager can be used to image selected colored subjects containing color samples with known spectrophotometrically characterized colorimetric properties. Imaging the colored subjects can produce a data set of digital imaging device response signals (e.g., device red, green, and/or blue channel measurements) that may be mapped to a corresponding colorimetric data (e.g., CIE XYZ color space coordinates). The parameters of a color transformation can be determined that match the transformed imager response signal output to the corresponding colorimetric measurements (e.g., a red, a green, and a blue channel measurement resulting from the spectrophotometric characterization of the color sample).

The traditional characterization can be performed once for the reference imager. The results of the characterization can be provided to the controller 344 as parameters of a baseline reference characterization applicable as a target for all imagers regardless of spectral properties. The baseline reference characterization can comprise a one dimensional (1D) lookup table (LUT) for linearizing an imager response, a matrix for transforming the linearized RGB into a color connection space, and a multi-dimensional lookup table (ND LUT) for mapping the connection space into color coordinates for rendering on a print or a device display. For a reference imager with known wavelength distribution, modeled and actual flat-fielded RGB response output signals for each of a set of N color patch targets, e.g., for the nth target, can be determined. For example, the modeled imager response signal output values $\tilde{S}$ can be determined as described in Eq. 1.4 and corresponding actual values $\overline{R}_n$, $\overline{G}_n$ and $\overline{B}_n$ can be determined, which can be arrange into an N×3 matrix $\overline{S}$ as follows:

$$\overline{S} = \begin{bmatrix} \overline{R}_1 & \overline{G}_1 & \overline{B}_1 \\ \overline{R}_2 & \overline{G}_2 & \overline{B}_2 \\ \vdots & \vdots & \vdots \\ \overline{R}_N & \overline{G}_N & \overline{B}_N \end{bmatrix}.$$ (Eq. 1.5)

We produce actual imager response signal output values by obtaining post-PRNU compensation scans of the colored subject sets including color sample patches and, then, averaging the flat-fielded RGB values of the pixels across each color sample patch individually.

For each color channel (e.g., RGB) a plot of the actual imager values against the modeled values can be described as a univariate, non-linear, scalar function, e.g., $$\tilde{R} \approx R = f_r(\overline{R}),$$ (Eq. 1.6)

$$\tilde{G} \approx G = f_g(\overline{G}),$$ (Eq. 1.7)

and $$\tilde{B} \approx B = f_b(\overline{B}),$$ (Eq. 1.8)

where $f_r$, $f_g$ and $f_b$ are of unknown parametric form.

To linearize actual flat-fielded RGB values to match the corresponding values predicted by the scan model, the univariate functions can be characterized using non-parametric regression techniques. A robust locally weighted scatterplot smoothing (RLOESS) and interpolation can be applied to obtain three, 1D LUT tables to transform the flat-fielded RGB values. From the set of colored samples described above, a 3×3 transformation matrix can be derived that, when multiplied with linearized device RGB values, can produce estimates for corresponding XYZ tristimulus value. For this purpose, it can be assumed that for the nth target the tristimulus measurements are $X_n$, $Y_n$ and $Z_n$, the tristimulus measurements can be arranged into an N×3 matrix C as follows:

$$C = \begin{bmatrix} X_1 & Y_1 & Z_1 \\ X_2 & Y_2 & Z_2 \\ \vdots & \vdots & \vdots \\ X_N & Y_N & Z_N \end{bmatrix} = \begin{bmatrix} c_1 \\ c_2 \\ \vdots \\ c_N \end{bmatrix} = [x \ y \ z],$$ (Eq. 1.9)

where each of the N rows of C can be denoted by a corresponding 1×3 row vector $$c_n = [X_n \ Y_n \ Z_n]$$ (Eq. 1.1)

or alternatively the 3 columns of C can be denoted individually using the corresponding N×1 column vectors $$x = \begin{bmatrix} X_1 \\ X_2 \\ \vdots \\ X_N \end{bmatrix}, y = \begin{bmatrix} Y_1 \\ Y_2 \\ \vdots \\ Y_N \end{bmatrix} \text{ and } z = \begin{bmatrix} Z_1 \\ Z_2 \\ \vdots \\ Z_N \end{bmatrix}.$$ (Eq. 1.2)

The linearized imager RGB values for each target; i.e., for the nth target the linearized RGB values $R_n$, $G_n$ and $B_n$, can be determined as described above and arranged into an N×3 matrix S as follows:

$$S = \begin{bmatrix} R_1 & G_1 & B_1 \\ R_2 & G_2 & B_2 \\ \vdots & \vdots & \vdots \\ R_N & G_N & B_N \end{bmatrix} = \begin{bmatrix} s_1 \\ s_2 \\ \vdots \\ s_N \end{bmatrix} = [r \ g \ b],$$ (Eq. 1.3a)

where each of the N rows of S can be denoted by a corresponding 1×3 row vector $$s_n = [R_n \ G_n \ B_n]$$ (Eq. 1.12b)

or alternatively the 3 columns of S can be denoted individually using the corresponding N×1 column vectors $$r = \begin{bmatrix} R_1 \\ R_2 \\ \vdots \\ R_N \end{bmatrix}, g = \begin{bmatrix} G_1 \\ G_2 \\ \vdots \\ G_N \end{bmatrix} \text{ and } b = \begin{bmatrix} B_1 \\ B_2 \\ \vdots \\ B_N \end{bmatrix}.$$ (Eq. 1.13)

A 3×3 transformation matrix M can have the following form:

$$M = \begin{bmatrix} m_{r,x} & m_{r,y} & m_{r,z} \\ m_{g,x} & m_{g,y} & m_{g,z} \\ m_{b,x} & m_{b,y} & m_{b,z} \end{bmatrix},$$ (Eq. 1.14)

such that M provides an approximate linear mapping between the XYZ and linearized RGB values of the target set, i.e.:

$$C \approx SM = \begin{bmatrix} s_1 \\ s_2 \\ \vdots \\ s_N \end{bmatrix} [m_x \ m_y \ m_z] = \begin{bmatrix} s_1 m_x & s_1 m_y & s_1 m_z \\ s_2 m_x & s_2 m_y & s_2 m_z \\ \vdots & \vdots & \vdots \\ s_N m_x & s_N m_y & s_N m_z \end{bmatrix},$$ (Eq. 1.15)

where $m_x$, $m_y$ and $m_z$ are the individual 3×1 column vectors of M. Note that Eq. 1.15 can also be expressed in vectorized form as follows:

$$c \approx \mathcal{S} m,$$ (Eq. 1.16)

where $c = \text{vec}(C^T)$, $m = \text{vec}(M^T)$, and $\mathcal{S} = S \otimes I_3$. The vec operator creates a column vector from a matrix by stacking its columns one below another, $\otimes$ denotes the Kronecker (tensor) product, and $I_3$ is the 3×3 identity matrix, Eq. 1.16 can thus be expressed elementwise as follows:

$$\begin{bmatrix} X_1 \\ Y_1 \\ Z_1 \\ X_2 \\ Y_2 \\ Z_2 \\ \vdots \\ X_N \\ Y_N \\ Z_N \end{bmatrix} = \begin{bmatrix} R_1 & 0 & 0 & G_1 & 0 & 0 & B_1 & 0 & 0 \\ 0 & R_1 & 0 & 0 & G_1 & 0 & 0 & B_1 & 0 \\ 0 & 0 & R_1 & 0 & 0 & G_1 & 0 & 0 & B_1 \\ R_2 & 0 & 0 & G_2 & 0 & 0 & B_2 & 0 & 0 \\ 0 & R_2 & 0 & 0 & G_2 & 0 & 0 & B_2 & 0 \\ 0 & 0 & R_2 & 0 & 0 & G_2 & 0 & 0 & B_2 \\ \vdots & \vdots & \vdots & \vdots & \vdots & \vdots & \vdots & \vdots & \vdots \\ R_N & 0 & 0 & G_N & 0 & 0 & B_N & 0 & 0 \\ 0 & R_N & 0 & 0 & G_N & 0 & 0 & B_N & 0 \\ 0 & 0 & R_N & 0 & 0 & G_N & 0 & 0 & B_N \end{bmatrix}$$ (Eq. 1.17)

$$\begin{bmatrix} \rho_x \\ \rho_y \\ \rho_z \\ \gamma_x \\ \gamma_y \\ \gamma_z \\ \beta_x \\ \beta_y \\ \beta_z \end{bmatrix} = \begin{bmatrix} \mathcal{S}_{1,x} m \\ \mathcal{S}_{1,y} m \\ \mathcal{S}_{1,z} m \\ \mathcal{S}_{2,x} m \\ \mathcal{S}_{2,y} m \\ \mathcal{S}_{2,z} m \\ \vdots \\ \mathcal{S}_{N,x} m \\ \mathcal{S}_{N,y} m \\ \mathcal{S}_{N,z} m \end{bmatrix},$$

where $$\mathcal{S}_{n,x} = s_n \otimes [1 \ 0 \ 0],$$

$$\mathcal{S}_{n,y} = s_n \otimes [0 \ 1 \ 0],$$

$$\mathcal{S}_{n,z} = s_n \otimes [0 \ 0 \ 1]$$ (Eq. 1.18)

are the 3N rows of $\mathcal{S}$, which we label with two indices to emphasize that each is associated with a corresponding $X_n$, $Y_n$ or $Z_n$ tristimulus value. Further, the 3×9 matrix can be defined $\mathcal{S}_n = s_n \otimes I_3$, such that equivalently for all $1 \leq n \leq N$:

$$c_n \approx s_n M = (\mathcal{S}_n m)^T.$$ (Eq. 1.19)

The vector m, thus the matrix M, can be selected by defining an error function $\chi^2(m)$ that measures the total disagreement between the matrixed imager response and the measured CIEXYZ tristimulus values. Writing the error function in terms of the vector m can facilitate a differential notation with a workable chain rule for expressing its derivatives, and by setting the derivatives of this mapping to zero and solving, the parameters that comparatively reduce it can be calculated, i.e., $$m = \arg\min_\theta \chi^2(\theta).$$ (Eq. 1.20)

To obtain the canonical solution to Eq. 1.20, merit function can be the residual sum of squares:

$$\chi^2(m) = \sum_{n=1}^{N} |\mathcal{S}_n m - c_n^T|^2 \qquad \text{(Eq. 1.21)}$$

$$= \sum_{n=1}^{N} (\mathcal{S}_n m - c_n^T)^T (\mathcal{S}_n m - c_n^T)$$

$$= (Sm - c)^T (Sm - c),$$

where, with respect to a column vector a, $|a|^2$ represents its vector norm and $a^T$ denotes its transpose. Using Eq. 1.21, the vector m can be found (and thus the matrix M) that provides the linear least-squares mapping by setting its derivative to zero and solving, as follows:

$$\frac{\partial \chi^2(m)}{\partial m} = \frac{\partial}{\partial m}((Sm-c)^T(Sm-c)) \qquad \text{(Eq. 1.22)}$$

$$= 2S^T(Sm - c)$$

$$= 2S^T Sm - 2S_C^T$$

$$= 0,$$

resulting in the following expression:

$$\mathcal{S}^T \mathcal{S} m = \mathcal{S}^T c, \qquad \text{(Eq. 1.23)}$$

which is equivalent elementwise to the expression $$S^T S M = S^T C. \qquad \text{(Eq. 1.24)}$$

Eq. 1.24 can be the normal equation of the least squares problem. The coefficients of M in this equation can be summarized as the 3×3 symmetric positive-definite matrix $\psi = S^T S$ and the left-hand side can be summarized as the a 3×3 matrix $\mu = S^T C$, such that $$\psi M = \mu, \qquad \text{(Eq. 1.25)}$$

and $$M = \psi \backslash \mu, \qquad \text{(Eq. 1.26)}$$

Solving an arbitrary least-squares problem directly from its normal equation can be numerically unstable and singular value decomposition (SVD) can be the selected approach. However, with a small number of parameters, solving this normal equation directly using Cholesky decomposition can be more efficient and provide adequate accuracy.

The least-squares method can comparatively reduce a selected unconstrained merit function; however, the resulting solution can produce a modeled white point that can be shifted from its true tristimulus values. Therefore, an alternate method for deriving the transformation matrix M in which white point preservation is enforced by use of its elements can be to satisfy the following constraints:

$$m_{r,x} + m_{g,x} + m_{b,x} = 1,$$

$$m_{r,y} + m_{g,y} + m_{b,y} = 1,$$

$$m_{r,z} + m_{g,z} + m_{b,z} = 1. \qquad \text{(Eq. 1.27)}$$

XYZ and RGB values can be normalized such that the at the white point $X_w = Y_w = Z_w = R_w = G_w = B_w = 1$. Consequently, M can be (see Eq. 1.14):

$$M = \begin{bmatrix} m_{r,x} & m_{r,y} & m_{r,z} \\ m_{g,x} & m_{g,y} & m_{g,z} \\ 1 - m_{r,x} - m_{g,x} & 1 - m_{r,y} - m_{g,y} & 1 - m_{r,z} - m_{g,z} \end{bmatrix}. \qquad \text{(Eq. 1.28)}$$

Substituting Eq. 1.28 into Eq. 1.15, $$\mathbb{C} \approx \mathbb{S} \mathbb{M}, \qquad \text{(Eq. 1.29)}$$

where $$\mathbb{C} = [x-b \; y-b \; z-b], \qquad \text{(Eq. 1.30)}$$

$$\mathbb{S} = [r-b \; g-b] \qquad \text{(Eq. 1.31)}$$

and $$\mathbb{M} \approx \begin{bmatrix} m_{r,x} & m_{r,y} & m_{r,z} \\ m_{g,x} & m_{g,y} & m_{g,z} \end{bmatrix}. \qquad \text{(Eq. 1.32)}$$

Eq. 1.29 can be expressed in vectorized form as $$c \approx \mathfrak{S} m \qquad \text{(Eq. 1.33)}$$

where $c = \text{vec}(\mathbb{C}^T)$, $\mathfrak{S} = \mathbb{S} \otimes I_3$, and $m = \text{vec}(\mathbb{M}^T)$. Further, the merit function in Eq. 1.21 can be expressed as $$\chi^2(m) = |\mathfrak{S} m - c|^2 = (\mathfrak{S} m - c)^T (\mathfrak{S} m - c), \qquad \text{(Eq. 1.34)}$$

where the vector m provides the constrained linear least-squares mapping can be determined by solving either of the following normal equations, which are equivalent elementwise:

$$\mathfrak{S}^T \mathfrak{S} \tilde{m} = \mathfrak{S}^T c \leftrightarrow \mathbb{S}^T \mathbb{S} \mathbb{M} = \mathbb{S}^T \mathbb{C}. \qquad \text{(Eq. 1.35)}$$

The solution for $\mathbb{M}$ can be found analogously to the approach above. Subsequently, the solution for M can be found from Eq. 1.28.

An underlying assumption in the previously described determinations is that each color sample patch used in deriving the transformation matrix provides equally important information about the quality of the resulting imager response model. However, modeling errors of selected color sample patches may include penalizing or weighting some errors more heavily than others. For example, errors in modeling neutral colors can be penalized more heavily than those of modeling saturated colors. Thus, an alternate solution for the transformation matrix M can be utilized that penalizes the neutral color errors more heavily. For example, instead of comparatively reducing the sum of squares, a weighted sum of squares can be comparatively reduced:

$$\chi^2(m) = \sum_{n=1}^{N} w_n (S_n m - c_n^T)^T (S_n m - c_n^T) = (\mathfrak{G} m - c)^T \mathcal{W} (\mathfrak{G} m - c), \qquad \text{(Eq. 1.36)}$$

where m, c, and $\mathfrak{S}$ were defined previously, and $w_n$ is the weighting factor for the nth color patch target with $w = [w_1 \; w_2 \ldots w_N]^T$, $W = \text{diag}(w)$, and $\mathcal{W} = W \otimes I_3$. The diag operator with a vector argument produces a diagonal matrix whose diagonal entries are the input vector.

The derivative of the error metric can be, set to zero and solved, resulting in the following two expressions, which are equivalent elementwise:

$$\mathfrak{S}^T \mathcal{W} \mathfrak{S} \tilde{m} = \mathfrak{S}^T \mathcal{W} c \leftrightarrow \mathbb{S}^T W \mathbb{S} \mathbb{M} = \mathbb{S}^T W \mathbb{C}. \qquad \text{(Eq. 1.37)}$$

The solutions for $\mathbb{M}$ and M can be then calculated as previously described.

The previously described least-squares solutions comparatively reduce squared tristimulus errors. In effect, these approaches can consider all tristimulus residuals of the same magnitude to be perceptually equivalent color differences. However, an alternate method for deriving the transformation matrix M can be utilized wherein an alternate merit function accounts for perceptual non-uniformity in the XYZ color space. A CIELAB color difference formula can be used. The CIELAB color difference formula can be based on a nonlinear transformation of tristimulus values X, Y and Z into a Cartesian coordinate space with axes L*, a* and b*. The formulae for computing these coordinates can be as follows:

$$L^* = L^*(Y) = 116 f\left(\frac{Y}{Y_w}\right) - 16, \quad \text{(Eq. 1.38)}$$

$$a^* = a^*(X, Y) = 500\left[f\left(\frac{X}{X_w}\right) - f\left(\frac{Y}{Y_w}\right)\right], \quad \text{(Eq. 1.39)}$$

$$b^* = b^*(Y, Z) = 200\left[f\left(\frac{Y}{Y_w}\right) - f\left(\frac{Z}{Z_w}\right)\right], \quad \text{(Eq. 1.40)}$$

where $X_w$, $Y_w$, and $Z_w$ are the tristimulus XYZ values of a reference white corresponding to imager RGB values $R_w$, $G_w$, and $B_w$; and where also $$f(t) = \begin{cases} t^{1/3} & t > (6/29)^3 \\ \frac{1}{3}\left(\frac{29}{6}\right)^2 t + \frac{4}{29} & \text{otherwise} \end{cases} \quad \text{(Eq. 1.41)}$$

Both XYZ and RGB values can be normalized such that $X_w = Y_w = Z_w = R_w = G_w = B_w = 1$. With such normalization, Eqs. 1.38-1.40 can be simplified as follows:

$$L^*(Y) = 116 f(Y) - 16, \quad \text{(Eq. 1.42)}$$

$$a^*(X, Y) = 500\ [f(X) - f(Y)], \quad \text{(Eq. 1.43)}$$

$$b^*(Y, Z) = 200\ [f(Y) - f(Z)], \quad \text{(Eq. 1.44)}$$

Once CIELAB coordinates have been calculated, CIELAB color difference can be computed as the Euclidean distance between points in the resulting space. For example, with respect to the tristimulus values $c_n = [X_n\ Y_n\ Z_n]$ for the $n^{th}$ color patch target the CIELAB color difference between these values and some other color $\dot{c}_n = [\dot{X}_n\ \dot{Y}_n\ \dot{Z}_n]$, can be determined as follows:

$$|\Delta E^*_n(\dot{c}_n)|^2 = (\Delta L^*_n(\dot{c}_n))^2 + (\Delta a^*_n(\dot{c}_n))^2 + (\Delta b^*_n(\dot{c}_n))^2, \quad \text{(Eq. 1.45)}$$

where $$\Delta E^*_n(\dot{c}_n) = [\Delta L^*_n(\dot{c}_n) \Delta a^*_n(\dot{c}_n) \Delta b^*_n(\dot{c}_n)], \quad \text{(Eq. 1.46)}$$

$$\Delta L^*_n(\dot{c}_n) = L^*(\dot{Y}_n) - L^*(Y_n), \quad \text{(Eq. 1.47)}$$

$$\Delta a^*_n(\dot{c}_n) = a^*(\dot{X}_n, \dot{Y}_n) - a^*(X_n, Y_n), \quad \text{(Eq. 1.48)}$$

$$\Delta b^*_n(\dot{c}_n) = b^*(\dot{Y}_n, \dot{Z}_n) - b^*(Y_n, Z_n). \quad \text{(Eq. 1.49)}$$

Assuming that the function f(•) applies elementwise when called with a vector or matrix argument, Eq. 1.46 can be rewritten in the following vector form:

$$\Delta E^*_n(\dot{c}_n) = (f(\dot{c}_n) - f(c_n)) J, \quad \text{(Eq. 1.50)}$$

where $$J = \begin{bmatrix} 0 & 500 & 0 \\ 116 & -500 & 200 \\ 0 & 0 & -200 \end{bmatrix}. \quad \text{(Eq. 1.51)}$$

Consequently, Eq. 1.45 can be rewritten as $$|\Delta E^*_n(\dot{c}_n)|^2 = (f(\dot{c}_n) - f(c_n)) H (f(\dot{c}_n) - f(c_n))^T, \quad \text{(Eq. 1.52)}$$

where $$H = JJ^T = \begin{bmatrix} 250{,}000 & -250{,}000 & 0 \\ -250{,}000 & 303{,}456 & -40{,}000 \\ 0 & -40{,}000 & 40{,}000 \end{bmatrix}. \quad \text{(Eq. 1.53)}$$

The following merit function can be formed:

$$\dot{\chi}^2 = \sum_{n=1}^N w_n |\Delta E^*_n(\dot{c}_n)|^2 \quad \text{(Eq. 1.54)}$$
$$= \sum_{n=1}^N w_n (f(\dot{c}_n) - f(c_n)) H (f(\dot{c}_n) - f(c_n))^T,$$

which can be written in vectorized form as follows:

$$\dot{\chi}^2(\dot{c}) = (f(\dot{c}) - f(c))^T \mathcal{W} (f(\dot{c}) - f(c)), \quad \text{(Eq. 1.55)}$$

where $\mathcal{W} = \mathcal{W}\ (I_N \otimes H)$, $\dot{c}$ is defined analogously to c and $\mathcal{W}$ can be defined in the context of Eq. 1.16 and Eq. 1.36, respectively.

For small color differences, Eq. 1.55 can be approximated by a second-degree Taylor polynomial:

$$\dot{\chi}^2(\dot{c}) \approx \dot{\chi}^2(c) - \dot{J}_\chi(c)(\dot{c}-c) + 1/2(\dot{c}-c)^T \dot{H}_\chi(c)(\dot{c}-c), \quad \text{(Eq. 1.56)}$$

where $\dot{J}_\chi(c)$ is the Jacobian vector of $\dot{\chi}^2(\dot{c})$ evaluated at c, and $\dot{H}_\chi(c)$ is the Hessian matrix of $\dot{\chi}^2(\dot{c})$ evaluated at c. The Jacobian vector can be calculated as follows:

$$j_\chi(\dot{c}) = \frac{\partial}{\partial \dot{c}} \dot{\chi}^2(\dot{c}) \quad \text{(Eq. 157)}$$
$$= \frac{\partial}{\partial \dot{c}} (f(\dot{c}) - f(c))^T \mathbb{W} (f(\dot{c}) - f(c))$$
$$= 2\ \text{diag}\ (f'(\dot{c})) \mathbb{W} (f(\dot{c}) - f(c)),$$

where $$f'(t) = \frac{d}{dt} f(t) = \begin{cases} \frac{1}{3} t^{-2/3} & t > (6/29)^3 \\ \frac{1}{3}\left(\frac{29}{6}\right)^2 & \text{otherwise} \end{cases} \quad \text{(Eq. 1.58)}$$

The Hessian matrix can be calculated as follows:

$$\dot{H}_\chi(\dot{c}) = \frac{\partial^2}{\partial \dot{c}^T \partial \dot{c}} \dot{\chi}^2(\dot{c}) = \frac{\partial}{\partial \dot{c}^T} \dot{j}_\chi(\dot{c}) \quad \text{(Eq. 1.59)}$$
$$= \frac{\partial}{\partial \dot{c}^T} (2\ \text{diag}(f'(\dot{c})) \mathbb{W} (f(\dot{c}) - f(c)))$$

-continued $$\hat{H}_\chi = 2 \, \text{diag}(f''(\dot{c}))W(f(\dot{c}) - f(c)) + 2 \, \text{diag}(f'(\dot{c}))\mathbb{W} \, \text{diag}(f'(\dot{c})).$$

where $$f''(t) = \frac{d}{dt} f'(t) = \begin{cases} \frac{2}{9} t^{-5/3} & t > (6/29)^3 \\ 0 & \text{otherwise} \end{cases} \quad (\text{Eq. 1.60})$$

From Eq. 1.55 the following may result:

$$\dot\chi^2(c) = [(f(\dot c) - f(c))^T \mathbb{W} \, (f(\dot c) - f(c))]|_{\dot c=c} = 0, \quad (\text{Eq. 1.61})$$

from Eq. 1.57 the following may result:

$$\dot J_\chi(c) = [2 \, \text{diag}(f'(\dot c)) \, \mathbb{W} \, (f(\dot c) - f(c))]|_{\dot c=c} = 0, \quad (\text{Eq. 1.62})$$

and from Eq. 1.59 the following may result:

$$\hat{H}_\chi(c) = \begin{aligned} & [2 \, \text{diag}(f''(\dot c))W(f(\dot c) - f(c)) + \\ & 2 \, \text{diag}(f'(\dot c))W \, \text{diag}(f'(\dot c))]|_{\dot c=c} \end{aligned} \quad (\text{Eq. 1.63})$$

$$= 2 \, \text{diag}(f'(c))W \, \text{diag}(f'(c)).$$

Thus, by substituting Eqs. 1.61-1.63 into Eq. 1.56, the following can result:

$$\dot\chi^2(\dot c) \approx (\dot c - c)^T \, \text{diag}(f'(c)) \, \mathbb{W} \, \text{diag}(f'(c))(\dot c - c). \quad (\text{Eq. 1.64})$$

Further, setting $\dot c$ to the estimates from the linear model, i.e., $\dot c = \mathcal{S}\,m$, the following can result:

$$\chi^2(m) = \dot\chi^2(\mathcal{S}\,m) \approx (\mathcal{S}\,m - c)^T \mathfrak{W} (\mathcal{S}\,m - c), \quad (\text{Eq. 1.65})$$

where $$\mathfrak{W} = \text{diag}(f'(c)) \, \mathbb{W} \, \text{diag}(f'(c)) \quad (\text{Eq. 1.66})$$

To find m and thus M, the derivative of this error metric can be set to zero and solved, as previously described, leading to the normal equation $$\mathcal{S}^T \mathfrak{W} \, \mathcal{S}_m = \mathcal{S}^T \mathfrak{W}_c \quad (\text{Eq. 1.67})$$

where the solution for m can be found analogously to the approach previously described.

To include white-point preservation, the merit function can be rewritten as $$\chi^2(\tilde m) = (\tilde{\mathcal{S}}\,m - c)^T \mathfrak{W} (\tilde{\mathcal{S}}\,m - c), \quad (\text{Eq. 1.68})$$

where the vector m providing the constrained linear least-squares mapping can be found by solving the normal equation:

$$\tilde{\mathcal{S}}^T \mathfrak{W} \, \tilde{\mathcal{S}}_m = \tilde{\mathcal{S}}^T \mathfrak{W}_c \quad (\text{Eq. 1.69})$$

The previously described method can provide a closed-form solution based on comparatively reducing a merit function which includes a multi-linear approximation of the CIELAB color difference formula. In cases where this approximation is not accurate, a transformation matrix M can be derived by accounting for perceptual non-uniformity in the XYZ color space using the following nonlinear merit function (see Eq. 1.55):

$$\chi^2(m) = (f(\mathcal{S}\,m) - f(c))^T \mathbb{W} (f(\mathcal{S}\,m) - f(c)), \quad (\text{Eq. 1.70})$$

Determining the best-fit parameters m that comparatively reduce the merit function can be performed as described above. However, due to its nonlinear nature, an iterative algorithm, whereby a successive improvement to an estimate $\hat m$ for m can instead be calculated until the merit function stops (or effectively stops) decreasing.

The merit function can be approximated by a second-degree Taylor polynomial:

$$\chi^2(m) \approx \chi^2(\hat m) - J_\chi(\hat m)(m - \hat m) + 1/2(m - \hat m)^T H_\chi(\hat m)(m - \hat m), \quad (\text{Eq. 1.71})$$

where $J_\chi(\hat m)$ is the Jacobian vector of $\chi^2(m)$ evaluated at $\hat m$, and $H_\chi(\hat m)$ is the Hessian matrix of $\chi^2(m)$ evaluated at $\hat m$. The derivative of Eq. 1.71 can be set equal to zero and solved to find a new estimate for m:

$$m = \hat m - (H_\chi(\hat m))^{-1} J_\chi^T(\hat m). \quad (\text{Eq. 1.72})$$

Iteratively applying Eq. 1.72 is known as Gauss-Newton minimization. On the one hand, if Eq. 1.71 is an accurate approximation of Eq. 1.70, then Gauss-Newton minimization will rapidly converge on the accurate solution for m. On the other hand, if Eq. 1.71 is not an accurate approximation of Eq. 1.70, then Gauss-Newton minimization may fail to improve the estimate of m. In this case, the inverse Hessian in Eq. 1.72 may be replaced by a small constant $\mu$, i.e.:

$$m = \hat m - \mu J_\chi^T(\hat m). \quad (\text{Eq. 1.73})$$

Eq. 1.73 can be described as a gradient descent minimization. As long as $\mu$ is small enough not to exhaust the downhill direction, this method will converge; although, the convergence rate is likely to be gradual. To vary smoothly between these two extremes, Eq. 1.72 can be combined with Eq. 1.73 heuristically, as follows:

$$m = \hat m - (H_\chi(\hat m) + \alpha \, \text{diag}(\text{diag}(H_\chi(\hat m))))^{-1} J_\chi^T(\hat m), \quad (\text{Eq. 1.74})$$

where, with respect to a matrix A, diag(A) produces a column vector containing the main diagonal of A. The diag operator with a vector argument can produce a diagonal matrix whose diagonal entries are the input vector, such that diag(diag(A)) is a diagonal matrix containing the main diagonal of A. $\alpha$ can behave as a blending factor which determines the mix between steepest descent and Gauss-Newton: for small $\alpha$ Eq. 1.74 approaches Eq. 1.72, while for large $\alpha$ Eq. 1.74 approaches Eq. 1.73. Between iterations of Eq. 1.74, $\alpha$ can be adjusted depending on whether $\chi^2$ is increasing or decreasing. If $\chi^2(m) \geq \chi^2(\hat m)$, then the current estimate $\hat m$ can be kept and $\alpha$ can be increased. If $\chi^2(m) < \chi^2(\hat m)$, then the estimate $\hat m \leftarrow m$ can be updated and $\alpha$ can be decreased. The algorithm can continue until $\chi_2$ is decreasing by a negligible amount. This method can be described as a Levenberg-Marquardt (LM) minimization.

To use Eq. 1.74, a Jacobian vector can be calculated, as follows:

$$\begin{aligned} J_\chi(m) &= \frac{\partial}{\partial m} \chi^2(m) \\ &= \frac{\partial}{\partial m} (f(\mathcal{S}m) - f(c))^T W(f(\mathcal{S}m) - f(c)) \\ &= 2\mathcal{S}^T \, \text{diag}(f'(\mathcal{S}m)) W(f(\mathcal{S}m) - f(c)). \end{aligned} \quad (\text{Eq. 1.75})$$

Further, we also calculate the Hessian matrix as follows:

$$\begin{aligned} H_\chi(m) &= \frac{\partial^2}{\partial m^2} \chi^2(m) = \frac{\partial}{\partial m^T} J_\chi(m) \\ &= \frac{\partial}{\partial m^T} (2 \, \mathcal{S}^T \, \text{diag}(f'(\mathcal{S}m))W(f(\mathcal{S}m) - f(c))) \\ &= 2\mathcal{S}^T \, \text{diag}(f''(\mathcal{S}m))\mathcal{S} \, W(f(\mathcal{S}m) - f(c)) + \\ &\quad 2\mathcal{S}^T \, \text{diag}(f'(\mathcal{S}m))W \, \text{diag}(f'(\mathcal{S}m))\mathcal{S}. \end{aligned} \quad (\text{Eq. 1.76})$$

Eq. 1.76 can depend both on the first derivative $f'(\mathcal{S}\,m)$ and on the second derivatve $f''(\mathcal{S}\,m)$. The multiplier of the second derivative can include the factor $(f(\mathcal{S}\,m) - f(c))$, which can be small for a successful model. Further, $H_\chi(m)$ can be used to set the step size for an iterative method, and can have no effect on the final set of parameters reached. Thus, the term involving the second derivative can be dismissed as negligible when compared to the term involving the first derivative, approximating Eq. 1.76 as follows:

$$H_\chi(m) \approx 2\,S^T \mathrm{diag}(f'(S\,m))\,W\,\mathrm{diag}(f'(S\,m))\cdot, \quad \text{(Eq. 1.77)}$$

Eq. 1.74 can be expressed as the following normal equation:

$$(H_\chi(\hat{m}) + \alpha\,\mathrm{diag}(\mathrm{diag}(H_\chi(\hat{m}))))\delta\hat{m} = -J_\chi^T(\hat{m}), \quad \text{(Eq. 1.78)}$$

where $$m = \hat{m} + \delta\hat{m}. \quad \text{(Eq. 1.79)}$$

As in previous sections, Cholesky decomposition can be used to solve Eq. 1.79. The procedure can be repeated for each iteration.

To include white-point preservation in this solution, the merit function can be rewritten as:

$$\chi^2(m) = (f(S\,m) - f(c))^T W\,(f(S\,m) - f(c)), \quad \text{(Eq. 1.80)}$$

where the vector m providing the constrained linear least-squares mapping can be found again using Levenberg-Marquarcit (LM) minimization with successive iterations governed by the following normal equation:

$$(H_\chi(\hat{m}) + \alpha\,\mathrm{diag}(\mathrm{diag}(H_\chi(\hat{m}))))\delta\hat{m} = -J_\chi^T(\hat{m}), \quad \text{(Eq. 1.81)}$$

where $$m = \hat{m} + \delta\hat{m}. \quad \text{(Eq. 1.82)}$$

The Jacobian vector can be calculated as $$J_\chi(m) = 2\,S^T \mathrm{diag}(f'(S\,m))\,W\,(f(S\,m) - f(c)), \quad \text{(Eq. 1.83)}$$

and the Hessian matrix can be calculated as $$H_\chi(m) = 2\,S^T \mathrm{diag}(f'(S\,m))\,W\,\mathrm{diag}(f'(S\,m))\,S. \quad \text{(Eq. 1.84)}$$

As previously described, Cholesky decomposition can be used to solve Eq. 1.81. The procedure can be performed for each iteration.

After matrixing, the reference imager response signal outputs can be converted into pipeline XYZ values which approximate CIEXYZ values of the corresponding colored targets. The pipeline XYZ values can be transformed into color coordinates to render on a print or a display device. A conventional color mapping can be generated using a multidimensional look-up tables (ND LUTs).

The previously described transformations of reference imager response signal outputs can be referred to as a reference imager calibration. A portion of the reference imager calibration and/or the results of the reference imager calibration can be stored in the memory 346 of the imaging device 340. The reference imager calibration/results can be utilized in further modeling and/or calibrating performed by the controller 344 of the imaging device 340.

Generating a color map can be computationally more expensive than determining the preceding 1D LUTs and transformation matrix. Furthermore, generating the color map can require manual adjustment by expert practitioners. Therefore, calibrating an imager of the plurality of imagers 342-1 . . . 342-N can be accomplished utilizing a method of leveraging the predetermined calibration of the reference imager. That is, a reference imager color map can be utilized to adjust a transformation matrix for the response values of the plurality of imagers 342-1 . . . 342-N to best approximate reference imager pipeline XYZ values.

Each of the plurality of imagers 342-1 . . . 342-N can be directly color calibrated to a reference imager. For example, for each of the plurality of imagers 342-1 . . . 342-N with determined spectral wavelength distribution, the modeled flat-fielded RGB output signals for each of a set of N colored targets can be obtained as previously described for the reference imager, e.g., for the nth target, the modeled device response values can be obtained and linearize with the reference linearization functions to obtain corresponding linearized values $\tilde{R}_n$, $\tilde{G}_n$ and $\tilde{B}_n$, which can be arranged into an N×3 matrix $\tilde{S}$ as follows:

$$\hat{S} = \begin{bmatrix} \hat{R}_1 & \hat{G}_1 & \hat{B}_1 \\ \hat{R}_2 & \hat{G}_2 & \hat{B}_2 \\ \vdots & \vdots & \vdots \\ \hat{R}_N & \hat{G}_N & \hat{B}_N \end{bmatrix}, \quad \text{(Eq. 1.85)}$$

such that the estimated XYZ values are given as $$\hat{C} = \hat{S}\hat{M}, \quad \text{(Eq. 1.86)}$$

where $\hat{M}$ is an N×3 transformation matrix.

Subsequently, to calibrate the imager, a total error function can be defined that measures the disagreement between the estimated XYZ values for the imager and the reference imager:

$$\chi^2(\hat{M}) = \sum_{n=1}^{N} E(s_n M, \hat{s}_n \hat{M}) \quad \text{(Eq. 1.87)}$$

where $E(c_n, \hat{c}_n)$ is the error metric describing the contribution by the $n^{th}$ color patch target to the total. The elements of the matrix $\hat{M}$ can be adjusted to comparatively reduce this error function. The linear, multi-linear and nonlinear methods described above can be adapted for this purpose, where the newly derived matrix allows the use of the remaining stages of the reference calibration without alteration.

However, direct independent color-calibration of each of the plurality of imagers 342-1 . . . 342-N does not avoid color rendering defects in a final stitched image from the plurality of imagers 342-1 . . . 342-N. To avoid color rendering defects, each of the plurality of imagers 342-1 . . . 342-N can be cross-calibrated to each other while jointly calibrating a composite of the plurality of imagers 342-1 . . . 342-N toward the reference imager.

As described above, the controller 344 can model a response of each of the plurality of imagers 342-1 . . . 342-N to a colored sample based on a corresponding imaging attribute. Modeling the response can additionally include estimating corresponding goal XYZ tristimulus values for each of the plurality of imagers 342-1 . . . 342-N. The controller 344 can utilize the spectral reflectance measurements of a set of N color sample patches for each of the plurality of imagers 342-1 . . . 342-N, and calculate for each colored sample the corresponding modeled device RGB values for each of a set of K selected imagers. Using the reference linearization, the controller 344 can then calculate corresponding linearized RGB values for each imager; i.e., for the kth imager and the nth target, and model the linearized device response values $R_{k,n}$, $G_{k,n}$ and $B_{k,n}$. For an imager, the modeled values into an N×3 matrix $S_k$ as follows:

$$S_k = \begin{bmatrix} R_{k,1} & G_{k,1} & B_{k,1} \\ R_{k,2} & G_{k,2} & B_{k,2} \\ \vdots & \vdots & \vdots \\ R_{k,N} & G_{k,N} & B_{k,N} \end{bmatrix} = \begin{bmatrix} s_{k,1} \\ s_{k,2} \\ \vdots \\ s_{k,N} \end{bmatrix} = [\, r_k \;\; g_k \;\; b_k \,],$$ (Eq. 1.88)

where each of the N rows of $S_k$ can be denoted by a corresponding 1×3 row vector $s_{k,n}$ or alternatively the 3 columns of $S_k$ can be denoted individually using the corresponding N×1 column vectors $r_k$, $g_k$ and $b_k$. The reference imager can be described as k=0, reserving $k \in \{1, \ldots, K\}$ to denote the indices of the plurality of imagers 342-1 . . . 342-N.

For each imager of the plurality of imagers 342-1 . . . 342-N a 3×3 transformation matrix can be derived such that when multiplied with the linearized device RGB values of the particular imager, estimates for corresponding goal XYZ tristimulus values are produced. For the $k^{th}$ imager and the $n^{th}$ colored target the tristimulus measurements can be $X_{k,n}$, $Y_{k,n}$ and $Z_{k,n}$. These measurements can be arranged into a N×3 matrix $C_k$ as follows:

$$C_k = \begin{bmatrix} X_{k,1} & Y_{k,1} & Z_{k,1} \\ X_{k,2} & Y_{k,2} & Z_{k,2} \\ \vdots & \vdots & \vdots \\ X_{k,N} & Y_{k,N} & Z_{k,N} \end{bmatrix} = \begin{bmatrix} c_{k,1} \\ c_{k,2} \\ \vdots \\ c_{k,N} \end{bmatrix} = [\, x_k \;\; y_k \;\; z_k \,],$$ (Eq. 1.89)

where each of the N rows of $C_k$ can be denoted by a corresponding 1×3 row vector $c_{k,n}$ or alternatively the 3 columns of C can be denoted individually using the corresponding N×1 column vectors $x_k$, $y_k$ and $z_k$.

For direct independent calibration of each imager of the plurality of imagers 342-1 . . . 342-N, the goal XYZ values can be obtained directly from the reference imager calibration. However, as discussed above the ability to match each imager of the plurality of imagers 342-1 . . . 342-N to the reference imager lessens as the imager attributes of each imager deviates increasingly from the reference imager imaging attributes. Instead, the controller 344 can define a composite model of the plurality of imagers 342-1 . . . 342-N for incorporation into a calculation that favorably weights imager response signal agreement over mismatched imager response signals to the reference imager response signals.

The controller 344 can model a response of a composite of the plurality of imagers to a colored sample. Modeling the response of the composite can include determining RGB values of a composite of the plurality of imagers 342-1 . . . 342-N based on the modeled RGB values derived from the modeled response output signals of each of the plurality of imagers 342-1 . . . 342-N to each of a plurality of colored samples.

The controller 344 can arrange the linearized RGB values of the composite of the plurality of imagers and selected goal XYZ values as a 3×3 transformation matrix $M_k$ with the following form:

$$M_k = \begin{bmatrix} m_{k,r,x} & m_{k,r,y} & m_{k,r,z} \\ m_{k,g,x} & m_{k,g,y} & m_{k,g,z} \\ m_{k,b,x} & m_{k,b,y} & m_{k,b,z} \end{bmatrix},$$ (Eq. 1.90)

such that $M_k$ provides an approximate linear mapping between $C_k$ and $S_k$, i.e., $$C_k \approx S_k M_k = \begin{bmatrix} c_{k,1} \\ c_{k,2} \\ \vdots \\ c_{k,N} \end{bmatrix} [\, m_{k,x} \;\; m_{k,y} \;\; m_{k,z} \,]$$

$$= \begin{bmatrix} s_{k,1} m_{k,x} & s_{k,1} m_{k,y} & s_{k,1} m_{k,z} \\ s_{k,2} m_{k,x} & s_{k,2} m_{k,y} & s_{k,2} m_{k,z} \\ \vdots & \vdots & \vdots \\ s_{k,N} m_{k,x} & s_{k,N} m_{k,y} & s_{k,N} m_{k,z} \end{bmatrix},$$ (Eq. 1.91)

where $m_{k,x}$, $m_{k,y}$ and $m_{k,z}$ are the individual 3×1 column vectors of $M_k$. Eq. 1.91 can also be expressed in vectorized form as follows:

$$c_k \approx \mathcal{S}_k m_k,$$ (Eq. 1.92)

where $c_k = \text{vec}(C_k^T)$, $m_k = \text{vec}(M_k^T)$ and $\mathcal{S}_k = S_k \otimes I_3$.

For the $n^{th}$ target the composite RGB values and $\bar{R}_n$, $\bar{G}_n$ and $\bar{G}_n$, can be arranged by the controller 344 into an N×3 matrix $\bar{S}$ as follows:

$$\bar{S} = \begin{bmatrix} \bar{R}_1 & \tilde{G}_1 & \bar{B}_1 \\ \bar{R}_2 & \bar{G}_2 & \bar{B}_2 \\ \vdots & \vdots & \vdots \\ \bar{R}_N & \bar{G}_N & \bar{B}_N \end{bmatrix} = \begin{bmatrix} \bar{s}_1 \\ \bar{s}_2 \\ \vdots \\ \bar{s}_N \end{bmatrix} = [\, \bar{r} \;\; \bar{g} \;\; \bar{b} \,],$$ (Eq. 1.93)

where each of the N rows of $\bar{S}$ can be a corresponding 1×3 row vector $\bar{s}_n$ or alternatively the 3 columns of $\bar{S}$ can be individually characterized using the corresponding N×1 column vectors $\bar{r}$, $\bar{g}$ and $\bar{b}$. For example, for the $n^{th}$ target, the composite RGB values $\bar{R}_n$, $\bar{G}_n$ and $\bar{B}_n$ can be initially computed as the center of the axis-aligned bounding box enclosing the points $\{(R_{k,n}, G_{k,n}, B_{k,n})\}$, that is:

$$\bar{R}_n = \frac{1}{2}\left(\max_k R_{k,n}\right) + \frac{1}{2}\left(\min_k R_{k,n}\right),$$ (Eq. 1.94)

$$\bar{G}_n = \frac{1}{2}\left(\max_k G_{k,n}\right) + \frac{1}{2}\left(\min_k G_{k,n}\right),$$ (Eq. 1.95)

$$\bar{B}_n = \frac{1}{2}\left(\max_k B_{k,n}\right) + \frac{1}{2}\left(\min_k B_{k,n}\right).$$ (Eq. 1.96)

Alternatively, other bounding volumes can also be selected, e.g., a bounding sphere; however, a geometric center (the mean) of the points can be avoided, which can separate from outliers in non-uniformly distributed data.

The controller 344 can generate a calibration for the modeled response of the composite of the plurality of imagers 342-1 . . . 342-N relative to corresponding reference imager responses (e.g., reference imager responses determined by imaging a spectrophotometrically characterized color sample patch with the reference imager and mapping a resulting value to a color channel measurement resulting from the spectrophotometric characterization, reference imager responses determined by modeling a response signal output of imaging a spectrophotometrically characterized color sample patch with the reference imager and mapping a resulting value to a color channel measurement resulting from the spectrophotometric characterization, etc.). That is, the model of the composite of the plurality of imagers 342-1 . . . 342-N can be mapped to the reference imager characterized as previously described. Generating a calibration can include generating a transformation matrix (e.g., the composite calibration matrix) to transform a modeled response output signal of the composite of the plurality of imagers 342-1 . . . 342-N to corresponding representative reference imager color map coordinates. The controller 344 can match the model of the composite of the plurality of imagers 342-1 . . . 342-N to the reference imager as previously described. The controller 344 can define a total error metric and find the transformation matrix that comparatively reduced the error metric:

$$X_0^2(\bar{\bar{M}}) = \sum_{n=1}^{N} E\left(s_{0,n} M_0, \bar{s}_n \bar{\bar{M}}\right)$$ (Eq. 1.97)

where the index k=0 denoted the reference imager. Specifically, the controller 344 can determine the solution to the following minimization problem:

$$\bar{\bar{M}} = \arg\min_{\theta} X_0^2(\theta).$$ (Eq. 1.98)

The controller 344 can generate a cross-calibration for the modeled response of the plurality of imagers 342-1 . . . 342-N to the modeled response of the composite of the plurality of imagers. That is, the controller can generate a separate transformation matrix (e.g., cross-calibration matrix) for each imager of the plurality of imagers 342-1 . . . 342-N based on the composite calibration matrix. The controller can generate the cross-calibration matrix by defining a total error metric relative to the composite calibration and determining the transformation matrix that comparatively reduce the error metric:

$$X_k^2(M_k) = \sum_{n=1}^{N} E\left(s_{k,n} M_k, \bar{s}_n \bar{\bar{M}}\right)$$ (Eq. 1.99)

where the controller 344 can determine the solution to the following minimization problem:

$$M_k = \arg\min_{\theta} X_k^2(\theta).$$ (Eq. 1.100)

The controller 344 can refine the composite scan model by defining an error metric for each of a plurality of colored targets and find the composite response signal output values that comparatively reduce the following error metric for each colored target sample:

$$\psi_{k,n}^2(\bar{s}_n) = \max_{k} E\left(s_{k,n} M_k, \bar{s}_n \bar{\bar{M}}\right)$$ (Eq. 1.101)

where we are seeking the solution to the following minimization problem:

$$M_k = \arg\min_{\theta} \psi_{k,n}^2(\bar{s}_n).$$ (Eq. 1.102)

After defining the refined values, the controller 344 can iterate the process from Eq. 1.97 to Eq. 1.100. Once iteration reaches a pre-defined error level or ceases to converge, the result can be a final cross-calibration, including calibration matrices for the reference imager, the k imagers, and the model of the composite of the plurality of imagers 342-1 . . . 342-N. In some examples, the matrices for the reference imager and the composite of the plurality of imagers 342-1 . . . 342-N can be concatenated with each of the individual cross-calibration matrices of each of the plurality of imagers 342-1 . . . 342-N to determine three matrices that jointly reduce color error to both the reference imager and to each other.

Once the cross-calibration is completed the controller 344 can apply the linearized LUTs derived from the reference imager to field flattened response output signals from each imager of the plurality of imagers 342-1 . . . 342-N regardless of the spectral characteristics of the imager; multiply the linearized imager response signal output values from each imager of the plurality of imagers 342-1 . . . 342-N by the corresponding cross-calibration matrix, which was derived with an iterative calibration calculation previously described; and stitch together the calibrated, linearized imager response signal output values from each imager and jointly calibrate them to match modeled response signal outputs from the reference imager. The resulting modeled XYZ values can be further processed by the controller 344 using a mapping obtained for the reference imager to obtain coordinates appropriate for rendering on a display or a print.

The controller 344 of the imaging device 340 can include and/or be in communication with a processing resource and non-transitory computer readable medium storing instructions executable by the processing resource to perform the functions of the model engine, the generate engine, and the generate engine previously described and/or the method steps described hereafter.

Figure 4:
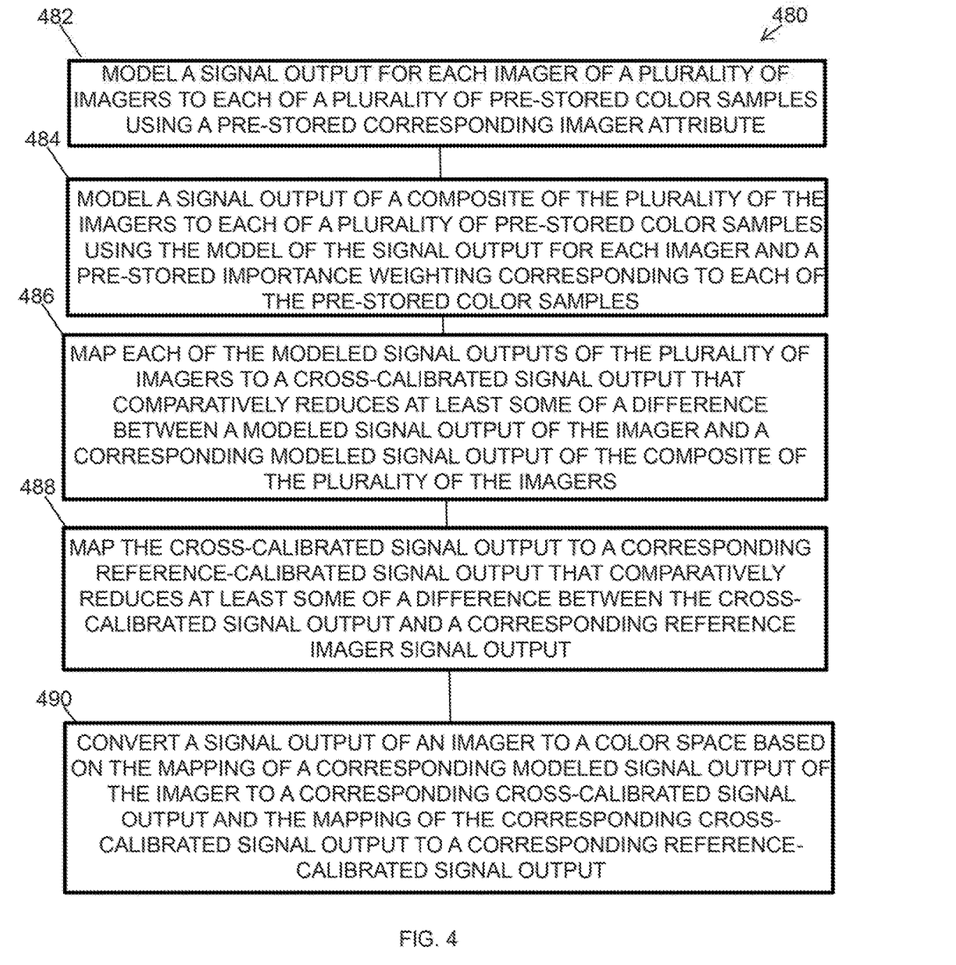
FIG. 4 illustrates an example of a method suitable for cross-calibration of imagers according to the present disclosure.

FIG. 4 illustrates a flow chart of an example of a method 480 for cross-calibration of a plurality of device imagers according to the present disclosure. The method 480 can model a response signal output of each of a plurality of imagers; model a signal output of a composite of the plurality of imagers; map each of the modeled signal outputs to a cross-calibrated signal output; map the cross-calibrated signal output to a reference calibrated signal; and convert a signal output of an imager to a color space based on the cross-calibration and reference calibration. Iteratively refining the composite model of the plurality of imagers and subsequently the cross-calibration and reference calibration to comparatively reduce both the incongruences between the plurality of imagers and composite calibration errors. In some examples, the method 480 can be performed utilizing a system (e.g., system 100 as referenced in FIG. 1); a computing device (e.g., computing device 220 as referenced in FIG. 2); and/or the imaging device 480.

At box 482 the method 480 can include modeling a signal output of each imager of a plurality of imagers. Modeling the response signal output can include modeling the response signal output that would be generated by an imager upon imaging each of a plurality of pre-stored color samples.

The pre-stored color samples can be colormetrically identical to the color samples of the colored subject including color samples imaged by the reference imager. Modeling a signal output of each of the plurality of imagers can be performed utilizing a pre-stored imager attribute corresponding to the imager for which the response signal output is modeled. The pre-stored corresponding device imager attribute can be based on a spectrometer measurement of an emission of a light emitting diode of each device imager.

At box 484 the method 480 can include modeling a signal output of a composite of the plurality of the imagers to each of the plurality of pre-stored color samples. A composite of the plurality of imagers can itself be a model or a representation of a composite of a portion of the imager attributes of the plurality of imagers and modeling can include modeling the response signal outputs corresponding to the composite of the plurality of imagers. The modeled response signal outputs can be modeled signal outputs of a composite of the plurality of imagers to each of the plurality of pre-stored color samples. The modeled signal outputs of a composite of the plurality of imagers can be determined using the model of the signal output for each imager and a pre-stored importance weighting corresponding to each of the pre-stored color samples. The pre-stored importance weighting corresponding to each of the pre-stored color samples can assign a greater weight to a pre-selected color than another less relevant color in modeling a signal output. For example, the pre-stored importance weighting corresponding to each of the pre-stored color samples can assign a greater weight to a neutral color than a saturated color in modeling a signal output for each device imager of the plurality of device imagers. Since the human eye is particularly adept at identifying neutral color incongruence in an image, weighting the neutral colors more heavily can utilize computational power to correct such defects more stringently than those occurring among saturated color sample response output signals.

At box 486 the method 480 can include mapping each of the modeled response signal outputs of the plurality of imagers to a cross-calibrated response signal output that comparatively reduces at least some of a difference between a modeled response signal output of the imager and a corresponding modeled response signal output of the composite of the plurality of the imagers. Mapping each of the modeled response signal outputs of the plurality of imagers to a cross-calibrated response signal output can include generating a transformation matrix to transform the modeled response signal outputs to a modeled cross-calibrated response signal output that reduces the differences among the modeled response signal outputs of the plurality of imagers by reducing the differences between the modeled response signal outputs of the plurality of imagers and the modeled response signals outputs of the composite of the plurality of the imagers.

At box 488 the method 480 can include mapping the cross-calibrated response signal output to a corresponding reference-calibrated response signal output. The corresponding reference-calibrated response signal output can be a response signal output that comparatively reduces at least some of a difference between the cross-calibrated response signal output and a corresponding reference imager signal output. That is, the mapping can be performed via applying the cross-calibrated response signal output into a transformation matrix to transform the response signal output to reduce the difference between the modeled cross-calibrated response signal output and a modeled reference imager signal output.

At box 490 the method 480 can include converting a response signal output of an imager to a color space based on the mapping of a corresponding modeled response signal output of the imager to a corresponding cross-calibrated signal output and the mapping of the corresponding cross-calibrated response signal output to a corresponding reference-calibrated response signal output. Converting can include transforming the response signal output of an imager with transformation matrices that utilize mathematical formulas to prefer agreement among the imagers of the plurality of imagers over agreement of the imagers with the reference imager.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate certain examples of the present disclosure, and should not be taken in a limiting sense.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for cross-calibration of a plurality of imagers, comprising:
    a model engine to model a first response of each of a plurality of imagers to a color sample;
    a model engine to model a second response of a composite of the plurality of imagers to the color sample based on the first response of each of the plurality of imagers to the color sample;
    a generate engine to generate a cross-calibration of the first response of each of the plurality of imagers to the second response of the composite of the plurality of imagers; and
    a generate engine to generate a calibration of the second response of composite of the plurality of imagers to a response of a reference imager.

2. The system of claim 1, wherein the response of the reference imager includes a modeled response of the reference imager.

3. The system of claim 1, wherein the calibration includes generating a transformation matrix to transform the first response of each of the plurality of imagers into intermediate device-independent color space coordinates.

4. The system of claim 3, wherein the calibration includes generating a transformation matrix to transform the intermediate device-independent color space coordinates into device-referred color connection space coordinates.

5. The system of claim 1, wherein a difference in outputs of adjacent imagers of the plurality of imagers is penalized more heavily than a difference in outputs of non-adjacent imagers during the cross-calibration.

6. An imaging device, comprising:
a plurality of imagers, each imager having a corresponding imaging attribute; and
a controller coupled to the plurality of imagers, wherein the controller:
models a first response of each of the plurality of imagers to a color sample based on the corresponding imaging attribute;
models a second response of a composite of the plurality of imagers to the color sample;
generates a cross-calibration of the first response of the plurality of imagers to the second response of the composite of the plurality of imagers; and
generates a calibration for the second response of the composite of the plurality of imagers relative to corresponding reference imager responses.

7. The imaging device of claim 6, wherein the imaging attribute includes a spectral property of a component of the corresponding imager pre-stored on a memory of the imaging device.

8. The imaging device of claim 7, wherein the spectral property is encoding of a wavelength distribution of a light emitted by a light emitting diode component of the imager.

9. The imaging device of claim 8, wherein the first response of each of the plurality of imagers to the color sample is a spectral model of a response of each of a plurality of color channels of light emitting diodes of the modeled imager to a test sample.

10. The imaging device of claim 6, wherein the reference imager is a predetermined nominal imager having a most probably encountered imaging attribute for an imager selected at random from an imager manufacturing line.

11. The imaging device of claim 10, wherein the corresponding reference imager responses are determined by imaging a spectrophotometrically characterized color sample patch with the reference imager and mapping a resulting value to a color channel measurement resulting from the spectrophotometric characterization.

12. The imaging device of claim 10, wherein the corresponding reference imager responses are determined by a modeling of an imaging of a spectrophotometrically characterized color sample patch with the reference imager and mapping a resulting value to a color channel measurement resulting from the spectrophotometric characterization.

13. A method for cross-calibration of imagers comprising:
modeling a first signal output for each imager of a plurality of imagers to each of a plurality of pre-stored color samples using a pre-stored corresponding imager attribute;
modeling a second signal output of a composite of the plurality of the imagers to each of a plurality of pre-stored color samples using the model of the first signal output for each imager and a pre-stored importance weighting corresponding to each of the pre-stored color samples;
mapping the first signal output of each imager of the plurality of imagers to a cross-calibrated signal output that comparatively reduces at least some of a difference between the first signal output of the imager and a corresponding second signal output of the composite of the plurality of the imagers;
mapping the cross-calibrated signal output to a corresponding reference-calibrated signal output that comparatively reduces at least some of a difference between the cross-calibrated signal output and a corresponding reference imager signal output; and
converting a third signal output of an imager to a color space based on the mapping of the corresponding first signal output of the imager to the corresponding cross-calibrated signal output and the mapping of the corresponding cross-calibrated signal output to the corresponding reference-calibrated signal output.

14. The method of claim 13, wherein the pre-stored importance weighting corresponding to each of the pre-stored color samples assigns a greater weight to a pre-selected color than another less relevant color in modeling a signal output for each imager of the plurality of imagers.

15. The method of claim 13, wherein the pre-stored corresponding imager attribute is based on a spectrometer measurement of an emission of a light emitting diode of each imager.

* * * * *

UNITED STATES PATENT AND TRADEMARK OFFICE
CERTIFICATE OF CORRECTION

PATENT NO. : 10,425,637 B2
APPLICATION NO. : 15/521701
DATED : September 24, 2019
INVENTOR(S) : David Berfanger et al.

Page 1 of 1

It is certified that error appears in the above-identified patent and that said Letters Patent is hereby corrected as shown below:

On the Title Page

In Column 2, item (57), Abstract, Lines 4-5, delete "the a" and insert -- of the --, therefor.

In Column 2, item (57), Abstract, Line 7, after "generating" delete "generate".

In the Claims

In Column 26, Line 53, Claim 1, after "of" insert -- the --.

In Column 27, Line 25 (approx.), Claim 8, after "is" insert -- an --.

Signed and Sealed this
Twenty-fourth Day of March, 2020

Andrei Iancu
*Director of the United States Patent and Trademark Office*